US012109603B2

(12) United States Patent
Ide et al.

(10) Patent No.: US 12,109,603 B2
(45) Date of Patent: Oct. 8, 2024

(54) ELECTRICAL HEATING APPARATUS

(71) Applicant: SUMITOMO HEAVY INDUSTRIES, LTD., Tokyo (JP)

(72) Inventors: Akihiro Ide, Ehime (JP); Masayuki Ishizuka, Ehime (JP); Masayuki Saika, Ehime (JP); Kimihiro Nogiwa, Ehime (JP); Norieda Ueno, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 1071 days.

(21) Appl. No.: 17/006,380

(22) Filed: Aug. 28, 2020

(65) Prior Publication Data

US 2020/0391273 A1 Dec. 17, 2020

Related U.S. Application Data

(63) Continuation of application No. PCT/JP2019/005138, filed on Feb. 13, 2019.

(30) Foreign Application Priority Data

Mar. 6, 2018 (JP) ................................ 2018-039362

(51) Int. Cl.
*H05B 3/03* (2006.01)
*B21D 26/033* (2011.01)
(Continued)

(52) U.S. Cl.
CPC ........... *B21D 37/16* (2013.01); *B21D 26/033* (2013.01); *C21D 1/40* (2013.01); *C21D 1/673* (2013.01);
(Continued)

(58) Field of Classification Search
CPC .. H05B 3/0023; H05B 3/0004; H05B 3/0009; H05B 3/03
(Continued)

(56) References Cited

U.S. PATENT DOCUMENTS 3,984,611 A * 10/1976 Varrasso ............ G05D 23/2401 373/40
4,063,027 A * 12/1977 Varrasso .............. H05B 3/0023 373/40
(Continued)

FOREIGN PATENT DOCUMENTS

CA 2981126 A1 * 10/2016 ........... B21D 26/027
JP 2004-351292 A 12/2004
(Continued)

OTHER PUBLICATIONS

JP2016-190248 (A), Nov. 2016, Masayuki et al., partial translation—Descr. (Year: 2016).*
(Continued)

*Primary Examiner* — Chris Q Liu
(74) *Attorney, Agent, or Firm* — Michael Best & Friedrich LLP

(57) ABSTRACT

An electrical heating apparatus for supplying electric power to a metal body to electrically heat the metal body, includes: at least two electrodes that come into contact with the metal body; a power supply unit that supplies electric power to the electrodes; a warning unit that issues a warning that abnormality has occurred in the electrical heating of the metal body; and an abnormality detection unit that detects abnormality of the electrodes, in which the abnormality detection unit includes a resistance value acquisition unit that acquires a resistance value between the electrodes, and an abnormality determination unit that determines that abnormality has occurred in the electrodes and controls the warning unit to issue a warning that abnormality has occurred in the electrodes, in a case where the resistance value reaches a predetermined setting value.

15 Claims, 3 Drawing Sheets

(51) Int. Cl.

| | |
|---|---|
| ***B21D 37/16*** | (2006.01) |
| ***C21D 1/40*** | (2006.01) |
| ***C21D 1/673*** | (2006.01) |
| ***C21D 7/13*** | (2006.01) |
| ***C21D 11/00*** | (2006.01) |

(52) U.S. Cl.
CPC ................ *C21D 7/13* (2013.01); *C21D 11/00* (2013.01); *H05B 3/03* (2013.01)

(58) Field of Classification Search
USPC .......................................................... 219/161
See application file for complete search history.

(56) References Cited

U.S. PATENT DOCUMENTS

| | | | | |
|---|---|---|---|---|
| 4,996,487 | A | 2/1991 | McSparran et al. | |
| 9,392,644 | B2 | 7/2016 | Nojiri et al. | |
| 9,855,593 | B2 | 1/2018 | Ishizuka et al. | |
| 10,173,254 | B2 | 1/2019 | Ueno et al. | |
| 10,751,780 | B2 * | 8/2020 | Saika | B21D 26/027 |
| 10,967,413 | B2 * | 4/2021 | Saika | B21D 26/047 |
| 2014/0123722 | A1 * | 5/2014 | Nojiri | C21D 1/40 72/342.6 |
| 2017/0120317 | A1 * | 5/2017 | Ishizuka | B21D 26/043 |
| 2018/0015519 | A1 * | 1/2018 | Saika | B21D 26/033 |
| 2018/0015520 | A1 * | 1/2018 | Saika | B21D 19/00 |
| 2018/0221933 | A1 * | 8/2018 | Saika | B21D 26/047 |
| 2019/0337034 | A1 * | 11/2019 | Saika | B21D 26/033 |
| 2019/0366410 | A1 * | 12/2019 | Nogiwa | B21D 39/02 |
| 2020/0016645 | A1 * | 1/2020 | Nogiwa | B21D 37/16 |
| 2021/0346934 | A1 * | 11/2021 | Ishizuka | B21D 26/035 |
| 2021/0362208 | A1 * | 11/2021 | Ishizuka | B21D 37/16 |
| 2022/0118500 | A1 * | 4/2022 | Kan | B21D 26/033 |

FOREIGN PATENT DOCUMENTS

| | | | | |
|---|---|---|---|---|
| JP | 2011-112911 | A | 6/2011 | |
| JP | 2013-185499 | A | 9/2013 | |
| JP | 2015-112608 | A | 6/2015 | |
| JP | 2016-002588 | A | 1/2016 | |
| JP | 2016190248 | A * | 11/2016 | |
| JP | 2016190252 | A * | 11/2016 | |
| WO | WO-2013/011553 | A1 | 1/2013 | |
| WO | WO-2016158778 | A1 * | 10/2016 | B21D 26/033 |

OTHER PUBLICATIONS

English translation of JP-2016190248-A (Year: 2016).*

Office Action issued in Canadian Application No. 3,091,098, dated Aug. 19, 2021.

International Search Report issued in Application No. PCT/JP2019/005138, mailed May 21, 2019.

Examiner's Report dated Feb. 21, 2024 for the corresponding Canadian Patent Application No. 3,091,098.

* cited by examiner

ELECTRICAL HEATING APPARATUS

RELATED APPLICATIONS

The contents of Japanese Patent Application No. 2018-039362, and of International Patent Application No. PCT/JP2019/005138, on the basis of each of which priority benefits are claimed in an accompanying application data sheet, are in their entirety incorporated herein by reference.

BACKGROUND

Technical Field

A certain embodiment of the present invention relates to an electrical heating apparatus.

Description of Related Art

In the related art, there is known a forming apparatus that heats a metal pipe material that is a metal body and supplies gas into the metal pipe material to form a metal pipe. As such a forming apparatus, for example, in the related art, there is disclosed a forming apparatus including a pair of dies, an electrode that can come into contact with and be electrically connected to a metal pipe material disposed between the pair of dies, and a power supply unit that can energize the metal pipe material through the electrode in a state where the electrode is electrically connected to the metal pipe material. This forming apparatus is an electrical heating apparatus that heats and die-forms a metal pipe material by Joule heat that is generated by energizing the metal pipe material.

SUMMARY

According to an embodiment of the present invention, there is provided an electrical heating apparatus for supplying electric power to a metal body to electrically heat the metal body, the electrical heating apparatus including: at least two electrodes that come into contact with the metal body; a power supply unit that supplies electric power to the electrodes; a warning unit that issues a warning that abnormality has occurred in the electrical heating of the metal body; and an abnormality detection unit that detects abnormality of the electrodes, in which the abnormality detection unit includes a resistance value acquisition unit that acquires a resistance value between the electrodes, and an abnormality determination unit that determines that abnormality has occurred in the electrodes and controls the warning unit to issue a warning that abnormality has occurred in the electrodes, in a case where the resistance value reaches a predetermined setting value.

BRIEF DESCRIPTION OF THE DRAWINGS

FIGS. 2A to 2C are enlarged views of the surroundings of an electrode, in which FIG. 2A is a diagram showing a state where the electrode holds a metal pipe material, FIG. 2B is a diagram showing a state where a sealing member is pressed against the electrode, and FIG. 2C is a front view of the electrode.

DETAILED DESCRIPTION

Figure 1:
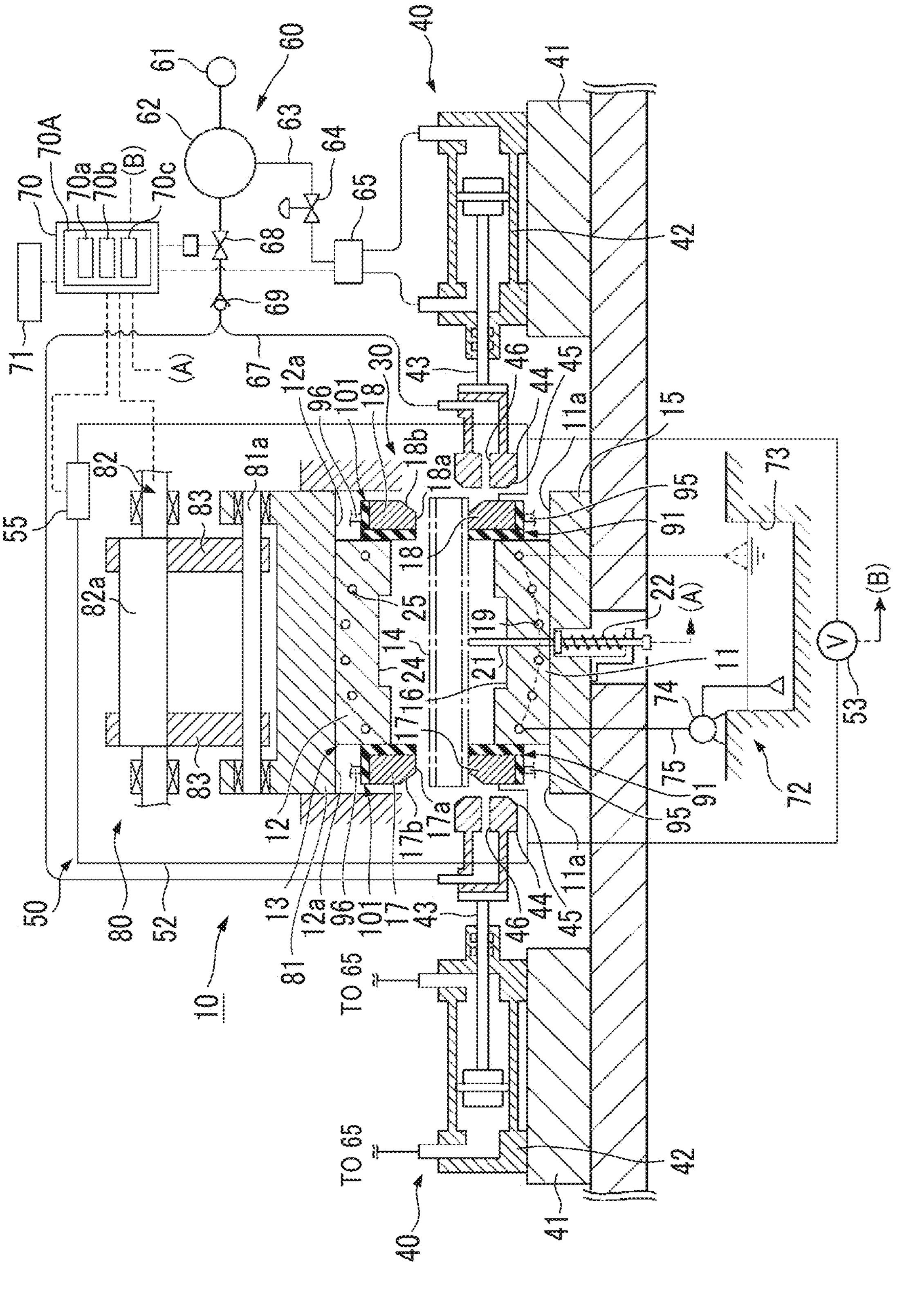
FIG. 1 is a schematic configuration diagram showing an electrical heating apparatus according to an embodiment of the present invention.

Incidentally, in the electrical heating apparatus as described above, in a case where the electrical heating of the metal pipe material is repeatedly performed, the electrode surface is damaged and serves as resistance at the time of energization, causing a defect such as heat generation of the electrode itself or hindrance to a temperature rise of the metal pipe material.

Therefore, it is desirable to provide an electrical heating apparatus in which it is possible to detect the occurrence of abnormality in an electrode and cause a worker to recognize the occurrence of abnormality.

The electrical heating apparatus may further include a smoothing unit that acquires a smoothed resistance value, which is a value obtained by smoothing the resistance values when electrical heating is performed multiple times.

According to such an electrical heating apparatus, the smoothed resistance value, which is a value obtained by smoothing the resistance values between the electrodes when electrical heating is performed multiple times, is acquired. The smoothed resistance value increases as the electrical heating is repeated and the degree of damage to the surfaces of the electrodes increases. In a case where the smoothed resistance value reaches a predetermined setting value, it is determined that the surfaces of the electrodes are damaged beyond a normal range, and a warning that abnormality has occurred in the electrodes is issued. Therefore, it is possible to detect the occurrence of abnormality in the electrodes and cause a worker to recognize the occurrence of abnormality.

Here, the smoothed resistance value may be a value obtained by a moving average of the resistance values when electrical heating is performed multiple times. According to this, it is possible to make the smoothed resistance value a value that appropriately reflects the resistance values between the electrodes when electrical heating is performed multiple times. Therefore, in a case where the smoothed resistance value reaches a predetermined setting value, it can be more appropriately determined that the surfaces of the electrodes are damaged beyond the normal range.

Further, the electrodes are capable of being replaced with new electrodes, and the abnormality determination unit may determine that abnormality has occurred in the electrodes and control the warning unit to issue a warning that prompts replacement of the electrodes, in a case where the smoothed resistance value reaches the setting value. According to this, when the occurrence of abnormality in the electrodes is detected, it is possible to cause a worker to perform an appropriate process such as replacement of the electrodes.

Further, the smoothed resistance value may be a value obtained by smoothing the resistance values when electrical heating is performed multiple times after the replacement of the electrodes. According to this, after the replacement of the electrodes, when the occurrence of abnormality in new electrodes is detected, it is possible to cause a worker to perform an appropriate process such as replacement of the electrodes.

Further, the abnormality determination unit may determine that abnormality has occurred in the metal body and control the warning unit to issue a warning that abnormality has occurred in the metal body, in a case where the resistance value reaches a value obtained by adding a predetermined allowable value to the smoothed resistance value. Here, in a case where the resistance value is equal to or larger than a predetermined allowable value with respect to the smoothed resistance value, rather than the possibility of the occurrence of abnormality in the electrodes, the possibility of the occurrence of abnormality (for example, the outer size of the metal body being outside a specified range, or the like) in the metal body is higher. Therefore, in a case where the resistance value reaches a value obtained by adding a predetermined allowable value to the smoothed resistance value, a warning that abnormality has occurred in the metal body is issued, whereby it is possible to cause a worker to recognize the occurrence of abnormality in the metal body.

Hereinafter, a preferred embodiment of an electrical heating apparatus according to the present invention will be described with reference to the drawings. In each drawing, identical or corresponding portions are denoted by the same reference numerals, and overlapping description will be omitted.

Configuration of Forming Apparatus

FIG. 1 is a schematic configuration diagram of a forming apparatus as an electrical heating apparatus. As shown in FIG. 1, a forming apparatus 10 for forming a metal pipe is configured to include a blow-forming die (die) 13 which includes an upper die 12 and a lower die 11, a drive mechanism 80 for moving at least one of the upper die 12 and the lower die 11, a pipe holding mechanism 30 for holding a metal pipe material 14 which is disposed between the upper die 12 and the lower die 11, a heating mechanism 50 for energizing and heating the metal pipe material 14 held by the pipe holding mechanism 30, a gas supply unit 60 for supplying high-pressure gas (gas) into the metal pipe material 14 held between the upper die 12 and the lower die 11 and heated, a pair of gas supply mechanisms 40 and 40 for supplying the gas from the gas supply unit 60 into the metal pipe material 14 held by the pipe holding mechanism 30, a water circulation mechanism 72 for forcibly water-cooling the blow-forming die 13, a warning device (warning unit) 71 that issues a warning when abnormality has occurred in the electrical heating of the metal pipe material 14, and a control unit 70 that controls the drive of the drive mechanism 80, the drive of the pipe holding mechanism 30, the drive of the heating mechanism 50, the gas supply of the gas supply unit 60, and the operation of the warning device 71, and detects abnormality during electrical heating.

The lower die 11 which is one side of the blow-forming die 13 is fixed to a base 15. The lower die 11 is formed of a large steel block and is provided with, for example, a rectangular cavity (recessed portion) 16 on the upper surface thereof. A cooling water passage 19 is formed in the lower die 11, and the lower die 11 is provided with a thermocouple 21 inserted from below at substantially the center. The thermocouple 21 is supported by a spring 22 so as to be movable up and down.

Further, a space 11*a* is provided in the vicinity of each of the right and left ends (right and left ends in FIG. 1) of the lower die 11, and electrodes 17 and 18 (lower electrodes) (described later), which are movable parts of the pipe holding mechanism 30, and the like are disposed in the spaces 11*a* so as to be able to move up and down. Then, the metal pipe material 14 is placed on the lower electrodes 17 and 18, whereby the lower electrodes 17 and 18 come into contact with the metal pipe material 14 which is disposed between the upper die 12 and the lower die 11. In this way, the lower electrodes 17 and 18 are electrically connected to the metal pipe material 14. The lower electrodes 17 and 18 can be replaced with new lower electrodes 17 and 18.

Insulating materials 91 for preventing electric conduction are provided between the lower die 11 and the lower electrode 17, below the lower electrode 17, between the lower die 11 and the lower electrode 18, and below the lower electrode 18. Each insulating material 91 is fixed to an advancing and retracting rod 95 which is a movable portion of an actuator (not shown) configuring the pipe holding mechanism 30. The actuator is for moving the lower electrodes 17 and 18 and the like up and down, and a fixed portion of the actuator is held on the base 15 side together with the lower die 11.

The upper die 12 which is the other side of the blow-forming die 13 is fixed to a slide 81 (described later) configuring the drive mechanism 80. The upper die 12 is formed of a large steel block and has a cooling water passage 25 formed in the interior thereof and, for example, a rectangular cavity (recessed portion) 24 provided on the lower surface thereof. The cavity 24 is provided at a position facing the cavity 16 of the lower die 11.

Similar to the lower die 11, a space 12*a* is provided in the vicinity of each of the right and left ends (right and left ends in FIG. 1) of the upper die 12, and electrodes 17 and 18 (upper electrodes) (described later), which are movable parts of the pipe holding mechanism 30, and the like are disposed in the spaces 12*a* so as to be movable up and down. Then, the upper electrodes 17 and 18 move downward in a state where the metal pipe material 14 is placed on the lower electrodes 17 and 18, whereby the upper electrodes 17 and 18 come into contact with the metal pipe material 14 disposed between the upper die 12 and the lower die 11. In this way, the upper electrodes 17, 18 are electrically connected to the metal pipe material 14. The upper electrodes 17 and 18 can be replaced with new upper electrodes 17 and 18.

Insulating materials 101 for preventing electric conduction are provided between the upper die 12 and the upper electrode 17, above the upper electrode 17, between the upper die 12 and the upper electrode 18, and above the upper electrode 18. Each insulating material 101 is fixed to an advancing and retracting rod 96 which is a movable portion of the actuator configuring the pipe holding mechanism 30. The actuator is for moving the upper electrodes 17 and 18 and the like up and down, and a fixed portion of the actuator is held on the slide 81 side of the drive mechanism 80 together with the upper die 12.

A semicircular arc-shaped concave groove 18*a* corresponding to the outer peripheral surface of the metal pipe material 14 is formed in each of the surfaces of the electrodes 18 and 18, which face each other, in the right side portion of the pipe holding mechanism 30 (refer to FIGS. 2A to 2C), and the metal pipe material 14 can be placed so as to exactly fit to the portion of the concave groove 18*a*. Similar to the concave groove 18*a*, a semicircular arc-shaped concave groove corresponding to the outer peripheral surface of the metal pipe material 14 is formed in each of exposed surfaces of the insulating materials 91 and 101, which face each other, in the right side portion of the pipe holding mechanism 30. Further, a tapered concave surface 18*b* in which the periphery is recessed to be inclined in a tapered shape toward the concave groove 18*a* is formed on the front surface of the electrode 18 (the surface in an outer direction of the die). Accordingly, a configuration is made such that, if the metal pipe material 14 is clamped from an up-down direction at the right side portion of the pipe holding mechanism 30, the outer periphery of the right end portion of the metal pipe material 14 can be exactly surrounded so as to be in close contact over the entire circumference.

A semicircular arc-shaped concave groove 17*a* corresponding to the outer peripheral surface of the metal pipe material 14 is formed in each of the surfaces of the electrodes 17 and 17, which face each other, in the left side portion of the pipe holding mechanism 30 (refer to FIGS. 2A to 2C), and the metal pipe material 14 can be placed so as to exactly fit to the portion of the concave groove 17*a*. Similar to the concave groove 17*a*, a semicircular arc-shaped concave groove corresponding to the outer peripheral surface of the metal pipe material 14 is formed in each of exposed surfaces of the insulating materials 91 and 101, which face each other, in the left side portion of the pipe holding mechanism 30. Further, a tapered concave surface 17*b* in which the periphery is recessed to be inclined in a tapered shape toward the concave groove 17*a* is formed on the front surface of the electrode 17 (the surface in the outer direction of the die). Accordingly, a configuration is made such that, if the metal pipe material 14 is clamped from the up-down direction at the left side portion of the pipe holding mechanism 30, the outer periphery of the left end portion of the metal pipe material 14 can be exactly surrounded so as to be in close contact over the entire circumference.

As shown in FIG. 1, the drive mechanism 80 includes the slide 81 for moving the upper die 12 such that the upper die 12 and the lower die 11 are combined with each other, a shaft 82 for generating a driving force for moving the slide 81, and a connecting rod 83 for transmitting the driving force generated by the shaft 82 to the slide 81. The shaft 82 extends in a right-left direction above the slide 81, is rotatably supported, and has an eccentric crank 82*a* which protrudes from the right and left ends and extends in the right-left direction at a position separated from the shaft center thereof. The eccentric crank 82*a* and a rotary shaft 81*a* provided above the slide 81 and extending in the right-left direction are connected to each other by the connecting rod 83. In the drive mechanism 80, the height in the up-down direction of the eccentric crank 82*a* is changed by controlling the rotation of the shaft 82 by the control unit 70, and the up-and-down movement of the slide 81 can be controlled by transmitting the positional change of the eccentric crank 82*a* to the slide 81 through the connecting rod 83. Here, the oscillation (rotational movement) of the connecting rod 83, which occurs when the positional change of the eccentric crank 82*a* is transmitted to the slide 81, is absorbed by the rotary shaft 81*a*. The shaft 82 rotates or stops in response to the drive of a motor or the like, which is controlled by the control unit 70, for example.

The control unit 70 has an abnormality detection unit 70A that detects abnormality in the electrodes 17 and 18. The abnormality detection unit 70A includes a resistance value acquisition unit 70*a* that acquires a resistance value R between the electrodes 17 and 18, a smoothing unit 70*b* that acquires a smoothed resistance value Ra, which is a value obtained by smoothing the resistance values R when electrical heating is performed heating multiple times, and an abnormality determination unit 70*c* that determines that abnormality has occurred in the electrodes 17 and 18 and controls the warning device 71 to issue a warning that abnormality has occurred in the electrodes 17 and 18, in a case where the smoothed resistance value Ra reaches a predetermined threshold value Rs (details will be described later).

The heating mechanism 50 includes a power supply unit 55, a busbar 52 which electrically connects the power supply unit 55 and the electrodes 17 and 18, and a voltmeter 53 as a voltage measurement unit that measures the voltage between the electrodes 17 and 18. The power supply unit 55 includes a direct-current power source and a switch and can energize the metal pipe material 14 through the busbar 52 and the electrodes 17 and 18 in a state where the electrodes 17 and 18 are electrically connected to the metal pipe material 14. Here, the busbar 52 is connected to the lower electrodes 17 and 18, and the voltmeter 53 is connected to a position near the lower electrode 17 of the busbar 52 and also connected to a position near the lower electrode 18 of the busbar 52. The voltmeter 53 inputs the measured voltage value (information from (B) shown in FIG. 1) to the resistance value acquisition unit 70*a* of the control unit 70.

In the heating mechanism 50, the direct-current current output from the power supply unit 55 is transmitted by the busbar 52 and input to the electrode 17. Then, the direct-current current passes through the metal pipe material 14 and is input to the electrode 18. Then, the direct-current current is transmitted by the busbar 52 and input to the power supply unit 55. The power supply unit 55 is configured to supply electric power of about 10,000 A 20 V or higher. The resistance value acquisition unit 70*a* acquires the current value of the direct-current current which is output by the power supply unit 55.

The resistance value acquisition unit 70*a* acquires the resistance value R between the electrodes 17 and 18, based on the current value of the direct-current current which is output by the power supply unit 55 and the voltage value measured by the voltmeter 53. The resistance value acquisition unit 70*a* acquires the resistance value R between the electrodes 17 and 18 at each time every time the metal pipe material 14 is electrically heated (refer to FIG. 4). The resistance value acquisition unit 70*a* outputs the acquired resistance value R to the smoothing unit 70*b* and the abnormality determination unit 70*c* of the control unit 70.

Figure 2A:
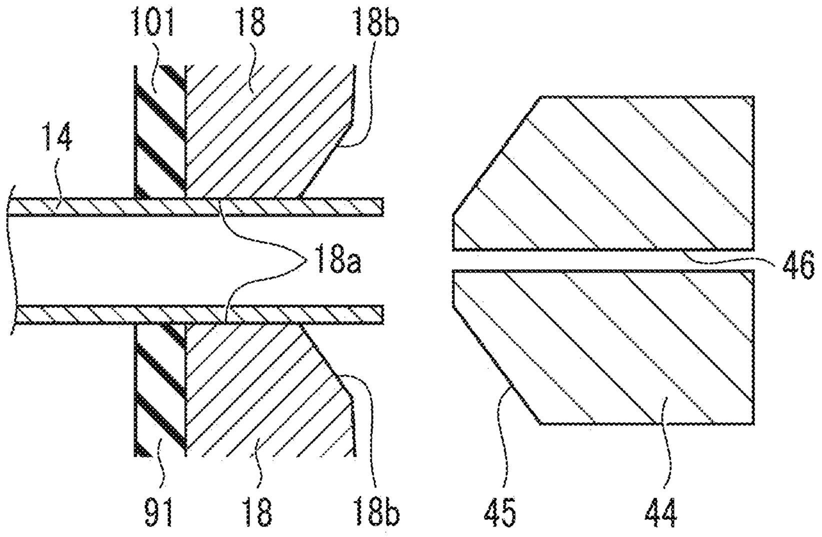
Figure 2B:
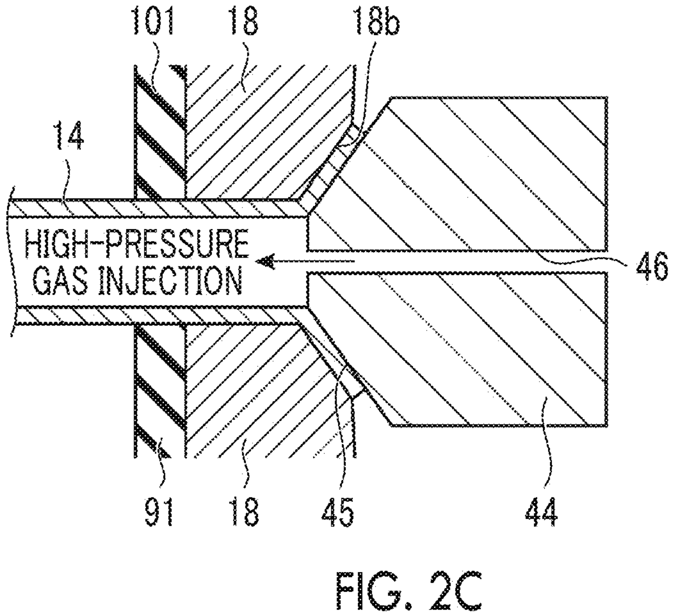
Figure 2C:
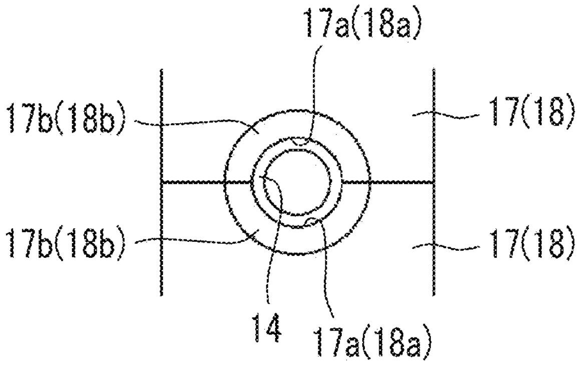

Each of the pair of gas supply mechanisms 40 includes a cylinder unit 42, a cylinder rod 43 which advances and retreats in accordance with the operation of the cylinder unit 42, and a sealing member 44 connected to the tip of the cylinder rod 43 on the pipe holding mechanism 30 side. The cylinder unit 42 is placed on and fixed to a block 41. A tapered surface 45 which is tapered is formed on the tip of the sealing member 44, and is configured in a shape which is fitted to the tapered concave surfaces 17*b* and 18*b* of the electrodes 17 and 18 (refer to FIGS. 2A to 2C). A gas passage 46 which extends from the cylinder unit 42 side toward the tip and through which the high-pressure gas supplied from the gas supply unit 60 flows, as specifically shown in detail in FIGS. 2A and 2B, is provided in the sealing member 44.

The gas supply unit 60 includes a gas source 61, an accumulator 62 for storing the gas supplied by the gas source 61, a first tube 63 extending from the accumulator 62 to the cylinder unit 42 of the gas supply mechanism 40, a pressure control valve 64 and a switching valve 65 provided in the first tube 63, a second tube 67 extending from the accumulator 62 to the gas passage 46 formed in the sealing member 44, and a pressure control valve 68 and a check valve 69 provided in the second tube 67. The pressure control valve 64 plays a role of supplying a gas having an operating pressure adapted to a pressing force of the sealing member 44 against the metal pipe material 14 to the cylinder unit 42. The check valve 69 plays a role of preventing the high-pressure gas from flowing backward in the second tube 67. The pressure control valve 68 provided in the second tube 67 plays a role of supplying a gas having an operating pressure for expanding the metal pipe material 14 to the gas passage 46 of the sealing member 44 by the control of the control unit 70.

The control unit 70 can supply a gas having a desired operating pressure into the metal pipe material 14 by controlling the pressure control valve 68 of the gas supply unit 60. Further, the control unit 70 acquires temperature information from the thermocouple 21 by information which is transmitted from (A) shown in FIG. 1, and controls the drive mechanism 80 and the like.

The water circulation mechanism 72 includes a water tank 73 for storing water, a water pump 74 for pumping up the water stored in the water tank 73, pressurizing it, and sending it to the cooling water passage 19 of the lower die 11 and the cooling water passage 25 of the upper die 12, and a pipe 75. Although omitted, a cooling tower for lowering a water temperature or a filter for purifying water may be provided in the pipe 75.

Method of Forming Metal Pipe using Forming Apparatus

Next, a method of forming a metal pipe using the forming apparatus 10 will be described. First, the quenchable steel grade cylindrical metal pipe material 14 is prepared. The metal pipe material 14 is placed (loaded) on the electrodes 17 and 18 provided on the lower die 11 side by using, for example, a robot arm or the like. Since the concave grooves 17*a* and 18*a* are formed in the electrodes 17 and 18, the metal pipe material 14 is positioned by the concave grooves 17*a* and 18*a*.

Next, the control unit 70 controls the drive mechanism 80 and the pipe holding mechanism 30, thereby causing the pipe holding mechanism 30 to hold the metal pipe material 14. Specifically, the upper die 12, the upper electrodes 17 and 18, and the like held on the slide 81 side move to the lower die 11 side by the drive of the drive mechanism 80, and both end portions of the metal pipe material 14 are clamped from above and below by the pipe holding mechanism 30 by operating the actuator which allows the upper electrodes 17 and 18 and the like and the lower electrodes 17 and 18 and the like, which are included in the pipe holding mechanism 30, to advance and retreat. The clamping is performed in such an aspect as to be in close contact over the entire circumference in the vicinity of both end portions of the metal pipe material 14 due to the presence of the concave grooves 17*a* and 18*a* formed in the electrodes 17 and 18 and the concave grooves formed in the insulating materials 91 and 101.

At this time, as shown in FIG. 2A, the end portion of the metal pipe material 14 on the electrode 18 side protrudes further toward the sealing member 44 side than the boundary between the concave groove 18*a* of the electrode 18 and the tapered concave surface 18*b* in an extending direction of the metal pipe material 14. Similarly, the end portion of the metal pipe material 14 on the electrode 17 side protrudes further toward the sealing member 44 side than the boundary between the concave groove 17*a* of the electrode 17 and the tapered concave surface 17*b* in the extending direction of the metal pipe material 14. Further, the lower surfaces of the upper electrodes 17 and 18 and the upper surfaces of the lower electrodes 17 and 18 are in contact with each other. However, there is no limitation to the configuration of being in close contact over the entire circumference of each of both end portions of the metal pipe material 14, and a configuration may be made such that the electrodes 17 and 18 are in contact with a part in the circumferential direction of the metal pipe material 14.

Subsequently, the control unit 70 controls the heating mechanism 50 to heat the metal pipe material 14. Specifically, the control unit 70 controls the power supply unit 55 of the heating mechanism 50 to supply electric power and perform constant current control. Then, the electric power which is transmitted to the lower electrodes 17 and 18 through the busbar 52 is supplied to the upper electrodes 17 and 18 clamping the metal pipe material 14 and the metal pipe material 14, and due to resistance which exists in the metal pipe material 14, the metal pipe material 14 itself generates heat by Joule heat. Then, the voltage value which is measured by the voltmeter 53 gradually rises, and when it reaches a predetermined value, energization is ended.

Subsequently, the blow-forming die 13 is closed to the heated metal pipe material 14 according to the control of the drive mechanism 80 by the control unit 70. In this way, the cavity 16 of the lower die 11 and the cavity 24 of the upper die 12 are combined with each other, and the metal pipe material 14 is disposed and sealed in the cavity portion between the lower die 11 and the upper die 12.

Thereafter, the both ends of the metal pipe material 14 are sealed by advancing the sealing member 44 by operating the cylinder unit 42 of the gas supply mechanism 40. At this time, as shown in FIG. 2B, the sealing member 44 is pressed against the end portion of the metal pipe material 14 on the electrode 18 side, whereby the portion protruding further toward the sealing member 44 than the boundary between the concave groove 18*a* and the tapered concave surface 18*b* of the electrode 18 is deformed in a funnel shape so as to follow the tapered concave surface 18*b*. Similarly, the sealing member 44 is pressed against the end portion of the metal pipe material 14 on the electrode 17 side, whereby the portion protruding further toward the sealing member 44 than the boundary between the concave groove 17*a* and the tapered concave surface 17*b* of the electrode 17 is deformed in a funnel shape so as to follow the tapered concave surface 17*b*. After the completion of the sealing, a high-pressure gas is blown into the metal pipe material 14 to form the metal pipe material 14 softened by heating so as to follow the shape of the cavity portion.

The metal pipe material 14 is softened by being heated to a high temperature (about 950° C.), and therefore, the gas supplied into the metal pipe material 14 thermally expands. For this reason, for example, the gas to be supplied is set to be compressed air, and thus the metal pipe material 14 having a temperature of 950° C. can be easily expanded by the thermally expanded compressed air.

The outer peripheral surface of the blow-formed and expanded metal pipe material 14 is rapidly cooled in contact with the cavity 16 of the lower die 11 and at the same time, is rapidly cooled in contact with the cavity 24 of the upper die 12 (since the upper die 12 and the lower die 11 have large heat capacity and are controlled to a low temperature, if the metal pipe material 14 comes into contact with the upper die 12 and the lower die 11, the heat of the pipe surface is removed to the die side at once), and thus quenching is performed. Such a cooling method is called die contact cooling or die cooling. Immediately after the rapid cooling, austenite is transformed into martensite (hereinafter, the transformation of austenite to martensite is referred to as martensitic transformation). Since a cooling rate is reduced in the second half of the cooling, the martensite is transformed into another structure (troostite, sorbite, or the like) due to reheating. Therefore, it is not necessary to separately perform tempering treatment. Further, in this embodiment, instead of the die cooling or in addition to the die cooling, cooling may be performed by supplying a cooling medium into, for example, the cavity 24. For example, the martensitic transformation may be generated by performing cooling by bringing the metal pipe material 14 into contact with the dies (the upper die 12 and the lower die 11) before a temperature at which the martensitic transformation begins, and then performing the die opening and blowing a cooling medium (cooling gas) to the metal pipe material 14.

As described above, the metal pipe material 14 is blow-formed and then cooled, and then the die opening is performed, thereby obtaining a metal pipe having, for example, a substantially rectangular tubular main body portion.

Through the above processes, the forming apparatus 10 finishes the forming of the metal pipe including the electrical heating on the metal pipe material 14, and subsequently, likewise performs the forming of the metal pipe including the electrical heating on the next metal pipe material 14. Incidentally, in a case where the electrical heating is repeatedly performed on the metal pipe material 14 in this manner, the surfaces of the electrodes 17 and 18 are damaged and the resistance value during energization increases. The determination of abnormality of the electrodes 17 and 18 based on this change in resistance value will be described below.

Figure 3:
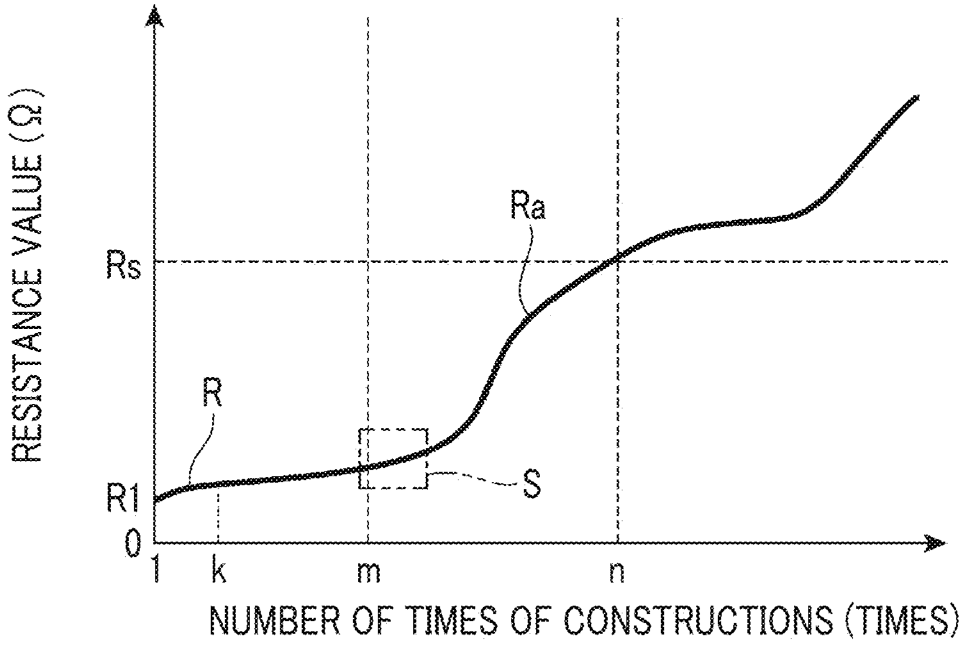
FIG. 3 is a graph showing an example of a change in a smoothed resistance value when electrical heating is performed multiple times.

FIG. 3 is a graph showing an example of a change in the smoothed resistance value Ra when electrical heating is performed multiple times, in which the horizontal axis represents the number of time of constructions and the vertical axis represents a resistance value. The smoothing unit 70*b* of the control unit 70 acquires the smoothed resistance value Ra that is a value obtained by smoothing the resistance values R between the electrodes 17 and 18 when electrical heating is performed multiple times, as shown in FIG. 3. Specifically, the smoothed resistance value Ra is a value obtained by smoothing the resistance values R between the electrodes 17 and 18 when electrical heating is performed multiple times after the most recent replacement of the electrodes 17 and 18. More specifically, the smoothed resistance value Ra is, for example, a value obtained by a moving average of the resistance values R between the electrodes 17 and 18 during electrical heating up to a predetermined number of times from the current electrical heating. Here, the smoothed resistance value Ra is a value obtained by a moving average of the resistance values R between the electrodes 17 and 18 at the time of electrical heating fork times, and the smoothed resistance value Ra cannot be acquired in a period from the first construction to the (k−1)-th construction, and therefore, with respect to the period, the resistance value R at each time is shown for reference in the drawing.

A resistance value R1 is a resistance value R at the time of electrical heating (at the time of the first electrical heating) immediately after the electrodes 17 and 18 has been replaced with new electrodes 17 and 18. The smoothed resistance value Ra gradually increases as the number of times of constructions increases. This indicates that the surfaces of the electrodes 17 and 18 are damaged by repeating the electrical heating and the resistance at the time of energization increases. The smoothing unit 70*b* outputs the acquired smoothed resistance value Ra to the abnormality determination unit 70*c* of the control unit 70.

The abnormality determination unit 70*c* of the control unit 70 stores a predetermined threshold value (setting value) Rs in advance. The abnormality determination unit 70*c* compares the smoothed resistance value Ra with the threshold value Rs, and determines that the surfaces of the electrodes 17 and 18 have been greatly damaged and abnormality has occurred in the electrodes 17 and 18, in a case where the smoothed resistance value Ra reaches the threshold value Rs. In FIG. 3, the smoothed resistance value Ra at the time of the n-th electrical heating has reached the predetermined threshold value Rs.

In a case where the abnormality determination unit 70*c* determines that abnormality has occurred in the electrodes 17 and 18, the abnormality determination unit 70*c* controls the warning device 71 to issue a warning that abnormality has occurred in the electrodes 17 and 18. This warning may be a warning that prompts replacement of the electrodes 17 and 18. The warning device 71 issues a warning by, for example, a lamp, a sound, a screen display, or the like.

Figure 4:
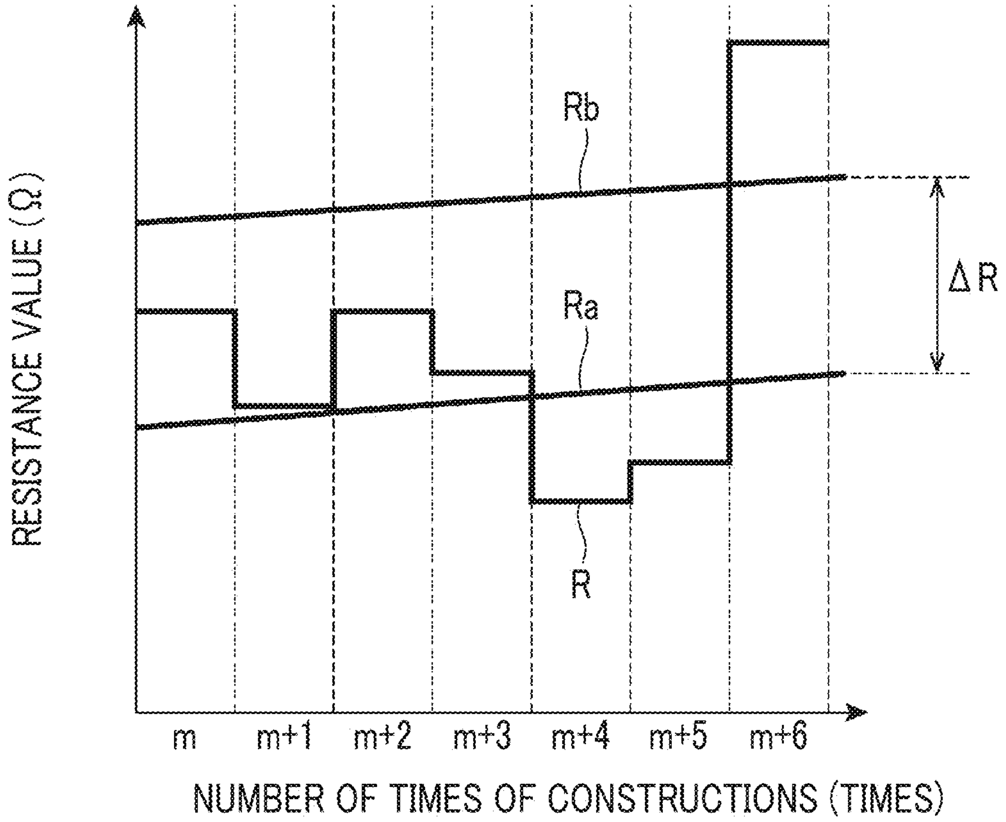
FIG. 4 is a graph showing a part of FIG. 3 in an enlarged manner.

FIG. 4 is a graph showing a region S indicated by a two-dot chain line in the graph of FIG. 3, in an enlarged manner. In FIG. 4, each resistance value R and the smoothed resistance value Ra from the m-th electrical heating to the (m+6) -th electrical heating, and a value (upper limit resistance value Rb) obtained by adding a predetermined allowable value ΔR to the smoothed resistance value Ra are shown. Since variation occurs in the degree of contact between the electrodes 17 and 18 and the metal pipe material 14, each resistance value R increases or decreases for each construction.

In a case where the resistance value R acquired in the current electrical heating reaches the upper limit resistance value Rb, since the degree of contact between the electrodes 17 and 18 and the metal pipe material 14 is excessively short, so that it is difficult for an electric current to flow, the abnormality determination unit 70*c* determines that abnormality (for example, the outer size or outer diameter of the metal pipe material 14 being smaller than a specified range, occurrence of an unacceptable degree of scratch or unevenness, or the like) has occurred in the metal pipe material 14. In FIG. 4, each resistance value R from the time of the m-th electrical heating to the time of the (m+5)-th electrical heating is smaller than the upper limit resistance value Rb, while the resistance value R at the time of the (m+6)-th electrical heating is larger than the upper limit resistance value Rb (that is, it has reached the upper limit resistance value Rb). Accordingly, the abnormality determination unit 70*c* determines that abnormality has occurred in the metal pipe material 14 subjected to the (m+6)-th electrical heating.

In a case where the abnormality determination unit 70*c* determines that abnormality has occurred in the metal pipe material 14, the abnormality determination unit 70*c* controls the warning device 71 to issue a warning that abnormality has occurred in the metal pipe material 14. This warning may be a warning that prompts replacement of the metal pipe material 14 that is electrically heated.

In this manner, according to this embodiment, the smoothed resistance value Ra, which is a value obtained by smoothing the resistance values R between the electrodes 17 and 18 when electrical heating is performed multiple times, is acquired. The smoothed resistance value Ra increases as the electrical heating is repeated and the degree of damage to the surfaces of the electrodes 17 and 18 increases. In a case where the smoothed resistance value Ra reaches a predetermined threshold value Rs, it is determined that the surfaces of the electrodes 17 and 18 are damaged beyond a normal range, and a warning that abnormality has occurred in the electrodes 17 and 18 is issued. Accordingly, it is possible to detect the occurrence of abnormality in the electrodes 17 and 18 and cause a worker to recognize the occurrence of abnormality.

Further, according to this embodiment, the smoothed resistance value Ra is a value obtained by a moving average of the resistance values R when electrical heating is performed multiple times. In this way, it is possible to make the smoothed resistance value Ra a value that appropriately reflects the resistance values R between the electrodes 17 and 18 when electrical heating is performed multiple times. Therefore, in a case where the smoothed resistance value Ra reaches the predetermined threshold value Rs, it can be more appropriately determined that the surfaces of the electrodes 17 and 18 are damaged beyond the normal range.

Further, the electrodes 17 and 18 can be replaced with new electrodes 17 and 18, and the abnormality determination unit 70c determines that abnormality has occurred in the electrodes 17 and 18 and controls the warning device 71 to issue a warning that prompts replacement of the electrodes 17 and 18, in a case where the smoothed resistance value Ra reaches the threshold value Rs. In this way, when the occurrence of abnormality in the electrodes 17 and 18 is detected, it is possible to cause a worker to perform an appropriate process such as replacement of the electrodes 17 and 18.

Further, the smoothed resistance value Ra is a value obtained by smoothing the resistance values R when electrical heating is performed multiple times after replacement of the electrodes 17 and 18. In this way, after the replacement of the electrodes 17 and 18, when the occurrence of abnormality in the new electrodes 17 and 18 is detected, it is possible to cause a worker to perform an appropriate process such as replacement of the electrodes 17 and 18.

Further, the abnormality determination unit 70c determines that abnormality has occurred in the metal pipe material 14 and controls the warning device 71 to issue a warning that abnormality has occurred in the metal pipe material 14, in a case where the resistance value R reaches the upper limit resistance value Rb obtained by adding the predetermined allowable value ΔR to the smoothed resistance value Ra. Here, in a case where the resistance value R is equal to or greater than the upper limit resistance value Rb, rather than the possibility of the occurrence of abnormality in the electrodes 17 and 18, the possibility of the occurrence of abnormality (for example, the outer size or outer diameter of the metal pipe material 14 being smaller than a specified range, occurrence of an unacceptable degree of scratch or unevenness, or the like) in the metal pipe material 14 is higher. Therefore, in a case where the resistance value R reaches the upper limit resistance value Rb, a warning that abnormality has occurred in the metal pipe material 14 is issued, whereby it is possible to cause a worker to recognize the occurrence of abnormality in the metal pipe material 14.

The present invention has been specifically described above based on the embodiment thereof. However, the present invention is not limited to the above embodiment. For example, in the above embodiment, the two electrodes 17 and 18 are provided. However, three or more electrodes may be adopted by adding electrodes on the inner side in the axial direction with respect to the electrodes 17 and 18.

Further, in a case where the maintenance of the electrodes 17 and 18 is performed, the smoothed resistance value Ra may be a value obtained by smoothing the resistance values R between the electrodes 17 and 18 when electrical heating is performed multiple times after the most recent maintenance of the electrodes 17 and 18.

Further, it is acceptable if the smoothed resistance value Ra is a value obtained by smoothing the resistance values R of the electrodes 17 and 18 when electrical heating is performed multiple times, and as a smoothing method, it is not limited to the moving average, and various curve fitting methods such as a least square method may be used.

Further, in the embodiment described above, a forming target is the metal pipe material 14. However, it is not limited to the metal pipe material 14, and the present invention can be applied to a metal rod-shaped body, a metal plate-shaped body, or the like, and, in short, the present invention can be applied to a metal body that extends to some extent. Further, the forming apparatus can also be a forging apparatus or the like, which performs electrical heating without supplying gas.

It should be understood that the invention is not limited to the above-described embodiment, but may be modified into various forms on the basis of the spirit of the invention. Additionally, the modifications are included in the scope of the invention.

What is claimed is:

1. An electrical heating apparatus for supplying electric power to a metal pipe material to electrically heat the metal pipe material, the electrical heating apparatus comprising:

at least two electrodes that come into contact with the metal pipe material;

a power supply unit that supplies electric power to the electrodes;

a warning unit that issues a warning that abnormality has occurred in the electrical heating of the metal pipe material; and an abnormality detection unit that detects abnormality of the electrodes, wherein the abnormality detection unit includes a resistance value acquisition unit that acquires a resistance value between the electrodes, and an abnormality determination unit that determines that abnormality has occurred in the electrodes, in a state where the electrodes and the metal pipe material are in contact with each other, and controls the warning unit to issue a warning that abnormality has occurred in the electrodes, in a case where the resistance value reaches a predetermined setting value.

2. The electrical heating apparatus according to claim 1, further comprising:

a smoothing unit that acquires a smoothed resistance value, which is a value obtained by smoothing the resistance values when electrical heating is performed multiple times, wherein the smoothed resistance value is a value obtained by a moving average of the resistance values when electrical heating is performed multiple times.

3. The electrical heating apparatus according to claim 2, wherein the abnormality determination unit determines that abnormality has occurred in the metal pipe material and controls the warning unit to issue a warning that abnormality has occurred in the metal pipe material, in a case where the resistance value reaches a value obtained by adding a predetermined allowable value to the smoothed resistance value.

4. The electrical heating apparatus according to claim 1, wherein the electrodes are capable of being replaced with new electrodes, and the abnormality determination unit determines that abnormality has occurred in the electrodes and controls the warning unit to issue a warning that prompts replacement of the electrodes, in a case where the resistance value reaches the setting value.

5. The electrical heating apparatus according to claim 4, wherein the resistance value is a value obtained by smoothing the resistance values when electrical heating is performed multiple times after the replacement of the electrodes.

6. The electrical heating apparatus according to claim 1, wherein the power supply unit and the electrodes constitute a heating mechanism for electrically heating the metal pipe material.

7. The electrical heating apparatus according to claim 6, wherein the heating mechanism includes a busbar which electrically connects the power supply unit and the electrodes, and a voltmeter that measures a voltage between the electrodes.

8. The electrical heating apparatus according to claim 1, further comprising:

a gas supply unit that supplies gas; and a gas supply mechanism for supplying the gas from the gas supply unit into the metal pipe material.

9. The electrical heating apparatus according to claim 8, wherein the gas supply mechanism includes a cylinder unit, a cylinder rod which advances and retreats in accordance with an operation of the cylinder unit, and a sealing member connected to a tip of the cylinder rod on a side of a pipe holding mechanism for holding the metal pipe material.

10. The electrical heating apparatus according to claim 9, wherein a tapered surface which is tapered is formed on a tip of the sealing member.

11. The electrical heating apparatus according to claim 9, wherein the gas supply unit includes a gas source, an accumulator, a first tube and a second tube, a first pressure control valve and a second pressure control valve, a switching valve, and a check valve.

12. The electrical heating apparatus according to claim 11, wherein the first pressure control valve supplies a gas having an operating pressure adapted to a pressing force against the metal pipe material to the cylinder unit, the check valve prevents a high-pressure gas from flowing backward in the second tube, and the second pressure control valve supplies a gas having an operating pressure for expanding the metal pipe material to a gas passage of the sealing member.

13. The electrical heating apparatus according to claim 1, further comprising:

a water circulation mechanism for forcibly water-cooling a blow-forming die.

14. The electrical heating apparatus according to claim 13, wherein the water circulation mechanism includes a water tank for storing water, a water pump for sending the water stored in the water tank to a cooling water passage, and a pipe.

15. The electrical heating apparatus according to claim 1, wherein a semicircular arc-shaped concave groove corresponding to an outer peripheral surface of the metal pipe material is formed in each of surfaces of the electrodes.

* * * * *